US008675672B1

(12) United States Patent
Bao et al.

(10) Patent No.: US 8,675,672 B1
(45) Date of Patent: Mar. 18, 2014

(54) HIERARCHICAL CLUSTER TREE OVERLAY NETWORK

(75) Inventors: Qi Bao, Boxborough, MA (US); Feng Zhang, Sherborn, MA (US); Qin Xin, Broken Arrow, OK (US)

(73) Assignee: EMC Corporation, Hopkinton, MA (US)

( * ) Notice: Subject to any disclaimer, the term of this patent is extended or adjusted under 35 U.S.C. 154(b) by 82 days.

(21) Appl. No.: 13/341,663

(22) Filed: Dec. 30, 2011

(51) Int. Cl.
H04L 12/28 (2006.01)
(52) U.S. Cl.
USPC .......................................... 370/408
(58) Field of Classification Search
USPC .............. 370/238, 252, 256, 392, 395.3, 401, 370/407, 408
See application file for complete search history.

(56) References Cited

U.S. PATENT DOCUMENTS

| | | | |
|---|---|---|---|
| 8,095,601 B2 | 1/2012 | Hasha et al. | |
| 8,549,180 B2 | 10/2013 | Critchley et al. | |
| 2003/0086425 A1* | 5/2003 | Bearden et al. | 370/392 |
| 2007/0028002 A1 | 2/2007 | McCanne | |
| 2008/0008202 A1 | 1/2008 | Terrell et al. | |
| 2009/0089300 A1 | 4/2009 | Vicente | |
| 2009/0207840 A1 | 8/2009 | McCanne | |
| 2010/0008252 A1* | 1/2010 | Alve et al. | 370/252 |
| 2010/0046363 A1* | 2/2010 | Shenoy et al. | 370/216 |
| 2011/0194444 A1* | 8/2011 | Karstens et al. | 370/252 |
| 2011/0271007 A1 | 11/2011 | Wang et al. | |
| 2012/0014272 A1* | 1/2012 | Zhou et al. | 370/252 |
| 2012/0106367 A1* | 5/2012 | Barkol et al. | 370/252 |
| 2013/0034031 A1 | 2/2013 | Sherman et al. | |

OTHER PUBLICATIONS

Aguilera et al., "Using Erasure Codes Efficiently for Storage in a Distributed Aystem", Proc. of the 2005 Int. Conf. On Dependable Systems and Networks (DSN'05), IEEE Computer Society, 2005.
Castro et al., "Topology-Aware Routing in Structured Peer-to-Peer Overlay Networks", A. Schiper et al. (Eds.), Future Directions in DC 2002, pp. 103-107, 2003.
Chang et al., "Bigtable: A Distributed Storage System for Structured Data", ACM. Trans. Comput. Syst. 26, 2, Article 4, Jun. 2008.
DeCandia et al., "Dynamo: Amazon's Highly Available Key-Value Store", SOSP'07, Oct. 14-17, 2007, Stevenson, Washington.
Dabek et al., "Designing a DHT for Low Latency and High Throughput", NSDI'04 Technical Paper, retrieved from http://static.usenix.org/events/nsdiO4/tech/full_papers/dabek/dabek_html/ on Jul. 19, 2012.

(Continued)

*Primary Examiner* — Anh-Vu Ly
*Assistant Examiner* — Gustavo Lopez-Vargas
(74) *Attorney, Agent, or Firm* — BainwoodHuang (57) ABSTRACT

A Hierarchical Cluster Tree (HCT) overlay network reflects underlying physical network topology including inter-node distances (e.g., hop count), and an HCT structure groups nodes based on distance measurements. Local area networks (LANs) are basic building blocks. The network includes first and second level-1 clusters of LANs, each LAN including computerized data processing and/or storage nodes. A distance between LANs in the level-1 clusters is less than or equal to a predefined level-1 maximum distance. The LANs of the first and second level-1 clusters form a level-2 cluster of LANs in which a distance between cluster medoid nodes of the level-1 clusters is less than or equal to a predefined level-2 maximum distance greater than the level-1 maximum distance. Clustering can be extended to higher levels having successively greater maximum distances.

16 Claims, 7 Drawing Sheets

(56) References Cited

OTHER PUBLICATIONS

Dabek et al., "Vivaldi: A Decentralized Network Coordinate System", SIGCOMM'04, Aug. 30-Sep. 3, 2004, Portland, Oregon.
Goodson et al., "Efficient Byzantine-Tolerant Erasure-Coded Storage", Proc. of the 2004 Int. Conference on Dependable Systems and Networks (DSN'04), IEEE Computer Society, 2004.
Greenan et al., "Reliability of XOR Based Erasure Codes on Heterogeneous Devices", International Conference on Dependable Systems and Networks, Anchorage, AK, pp. 147-156, Jun. 24-27, 2008.
Greenan, "Reliability and Power-Efficiency in Erasure-Coded Storage Systems", Technical Report UCSC-SSRC-09-08, University of California, Santa Cruz, Dec. 2009.
Hafner et al., "Notes on Reliability Models for Non-MDS Erasure Codes", IBM report, 2006.
Lakshman et al., "Cassandra—A Decentralized Structured Storage System", ACM SIGOPS Operating Systems Review, vol. 44, Issue 2, pp. 35-40, Apr. 2010.
Prasad et al. "Bandwidth Estimation: Metrics, Measurement Techniques, and Tools", IEEE Network, vol. 17, Issue 6, pp. 27-35, Nov./Dec. 2003.
Ratnasamy et al., "A Scalable Content-Addressable Network", SIGCOMM01, Aug. 27-31, 2001, San Diego, CA.
Ratnasamy et al., "Topologically-Aware Overlay Construction and Server Selection", INFOCOM2002, 21st Annual Joint Conf. of the IEEE Comp. and Com. Societies, pp. 1190-1199, 2002.
Rowstron et al., "Pastry: Scalable, Distributed Object Location and Routing for Large-Scale Peer-to-Peer Systems", R. Guerraoui (Ed.), Middleware 2001, pp. 329-350, 2001.
Stoica et al., "Chord: A Scalable Peer-to-Peer Lookup Service for Internet Applications", SIGCOMM'01, Aug. 27-31, 2001, San Diego, CA.
Weatherspoon, Hakim, "Design and Evaluation of Distributed Wide-Area On-line Archival Storage Systems", Appears in University of Califonia, Berkeley PhD Dissertation, Technical Report No. UCB/EECS-2006-130, Oct. 13, 2006.
Weil et al., "CRUSH: Controlled, Scalable, Decentralized Placement of Replicated Data", SC2006, Nov. 2006, Tampa, FL.

* cited by examiner

HIERARCHICAL CLUSTER TREE OVERLAY NETWORK

CROSS REFERENCE TO RELATED APPLICATIONS

This application claims the benefit under 35 U.S.C. §119 (e) of the following U.S. provisional applications, the contents of each of which are hereby incorporated by reference:
1. Application Ser. No. 61/582,108 filed Dec. 30, 2011, entitled Techniques for Network-Assisted Routing for Topology-Aware IP Overlay Networks,
2. Application Ser. No. Application Ser. No. 61/582,117 filed Dec. 30, 2011, entitled Techniques Relating To Quantitative System Reliability Analysis,
3. Application Ser. No. Application Ser. No. 61/582,122 filed Dec. 30, 2011, entitled Techniques for Two-level Distributed Hash Table (DHT) Data Placement,
4. Application Ser. No. Application Ser. No. 61/582,125 filed Dec. 30, 2011, entitled Techniques For Policy-Based Intelligent Data Placement,
5. Application Ser. No. Application Ser. No. 61/582,128 filed Dec. 30, 2011, entitled Techniques for Data Partitioning and Storage in Connection with Video,

BACKGROUND

The invention is related to the field of computer networks.

Computer networks may be organized in a manner referred to as an "overlay network". An overlay network is a logical collection of member network nodes over an underlying or "substrate" network. Overlay networks can improve the design and operation of a wide variety of distributed applications, by providing an abstraction of the underlying network that may be tailored to the needs of the application, along with features and/or tools that support network functions of the application.

Some overlay networks may be formed without consideration of underlying physical network topology, in which case the routing of message in such overlay networks is based on logical topology only. For example, there are known Distributed Hash Table (DHT) based overlay networks that utilize a logical ring topology and conduct routing based on such logical ring. Two neighbors on the logical overlay network could be far away from each other in underlying substrate or physical network. This situation can be viewed as a mismatch between physical network topology and logical topology. Such a mismatch can degrade performance of the overlay network, because routing decisions that are sensible at the logical level may be far from optimal at the physical level. A message traveling straight from one neighbor to the next at the logical layer may be traveling a needlessly long and/or circuitous path in the physical network.

Topology-aware overlay network protocols aim to mitigate mismatch between physical and logical networks. Known protocols include features such as measuring round trip time (RTT) to known landmark nodes and grouping nodes based on similarity of RTTs; measuring node proximities as indicated by RTT values and grouping nodes based on measured RTT values; and use of a synthesized network map to capture underlying physical topology.

SUMMARY

To obtain high performance from distributed applications, it is desired to employ an overlay network that reflects underlying physical network topology. However, known topology-aware overlay protocols such as those referred to above may be unduly limited in this respect. Known overlay protocols do not attain a desired high degree of matching between the logical structure of the overlay network to the structure of the underlying physical network. For example, in landmark-based protocols the reliance on round trip time (RTT) may group together nodes that are spaced from a landmark node in different directions and therefore potentially quite distant from each other. The techniques used in creating synthetic network maps are known to suffer from inaccuracies. It would be desirable to create an overlay network having a higher level of matching to the underlying physical network, so that data placement and/or routing in the overlay network sufficiently reflects the structural and operational parameters of the physical network to make efficient use thereof, thereby maximizing overlay network performance.

The present disclosure is directed to a topology-aware overlay network that accurately reflects underlying physical network topology. Referred to as Hierarchical Cluster Tree (HCT), the overlay network utilizes network distance measurements between nodes, such as a hop count of intervening routers in the physical network, and constructs a hierarchical clustering structure to group nodes together based on the network distance measurements. The protocol is distributed in nature and achieves efficient routing. A Hierarchical Cluster Tree protocol builds a hierarchical cluster tree structure based on physical network topology, and the structure resembles actual physical network topology insofar as clustered nodes and grouped clusters are physically closer to each other.

The HCT network uses local area networks (LANs) as basic building blocks. Generally, nodes are connected by different networking devices, such as switches and routers. Some nodes are connected to the same switch(es) within the same LAN. These nodes are natural neighbors and share a common "broadcast domain" which is the LAN. that is, a network-level broadcast message can be received by all nodes in the same LAN. A LAN having one or more nodes connected is the basic unit for HCT protocol operation.

In one aspect, the disclosed overlay network includes first and second clusters of LANs, where each LAN includes one or more physical computerized nodes that perform data processing and storage operations. A distance between any pair of LANs of the first cluster of LANs is less than or equal to a predefined level-1 maximum distance value according to a distance metric, and a distance between any pair of LANs of the second cluster of LANs is also less than or equal to the predefined level-1 maximum distance value. Additionally, one LAN of the each cluster has a cluster medoid node having a smallest average distance to nodes of the other LANs of the cluster.

The LANs of the first and second clusters form a level-2 cluster of LANs in which a distance between the cluster medoid nodes of the clusters is less than or equal to a predefined level-2 maximum distance value according to the distance metric, wherein the predefined level-2 maximum distance value is greater than the predefined level-1 maximum distance value.

The clustering of level 2 can be extended to one or more higher levels, where successively higher levels have successively greater maximum distance values. By this technique, an HCT structure is built that encompasses potentially a very large number of network nodes. The structure can be used in a variety of ways. Fundamental aspects of utilization will generally include both distributed data placement and routing. The LAN-based HCT structure may lend itself particularly well to certain forms of DHT data placement schemes.

Efficient routing can be obtained by hierarchical structuring of routing information, so that storage and processing are divided into several smaller or less complex operations than would be required in a non-hierarchical structure. Additionally, due to the use of LANs and accurate distance measurements, the overlay network has a high degree of matching with the underlying physical network, providing for efficient overlay network construction and operation.

The overlay network can be used for any of a variety of distributed applications involving distributed storage of data and potentially distributed processing of data as well. One such distributed application is a wide-area video surveillance system, such as may be used by an organization to capture, store, process and otherwise use video data obtained from surveillance video cameras distributed over a wide area (e.g., different areas of a city or state, or more widely separated regions). Such an application can benefit from maintaining and processing large video files locally rather than requiring them to be sent across a network to a central location for centralized storage and processing. The video data can be fragmented and stored on multiple nodes using a DHT approach, exploiting certain structure of video information that may be present. For example, certain forms of video encoding naturally create chunks or segments that are relatively self-contained, such as an I frame and associated B frames in MPEG encoding. This is only one example of a type of application that can be deployed beneficially on the disclosed overlay network.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
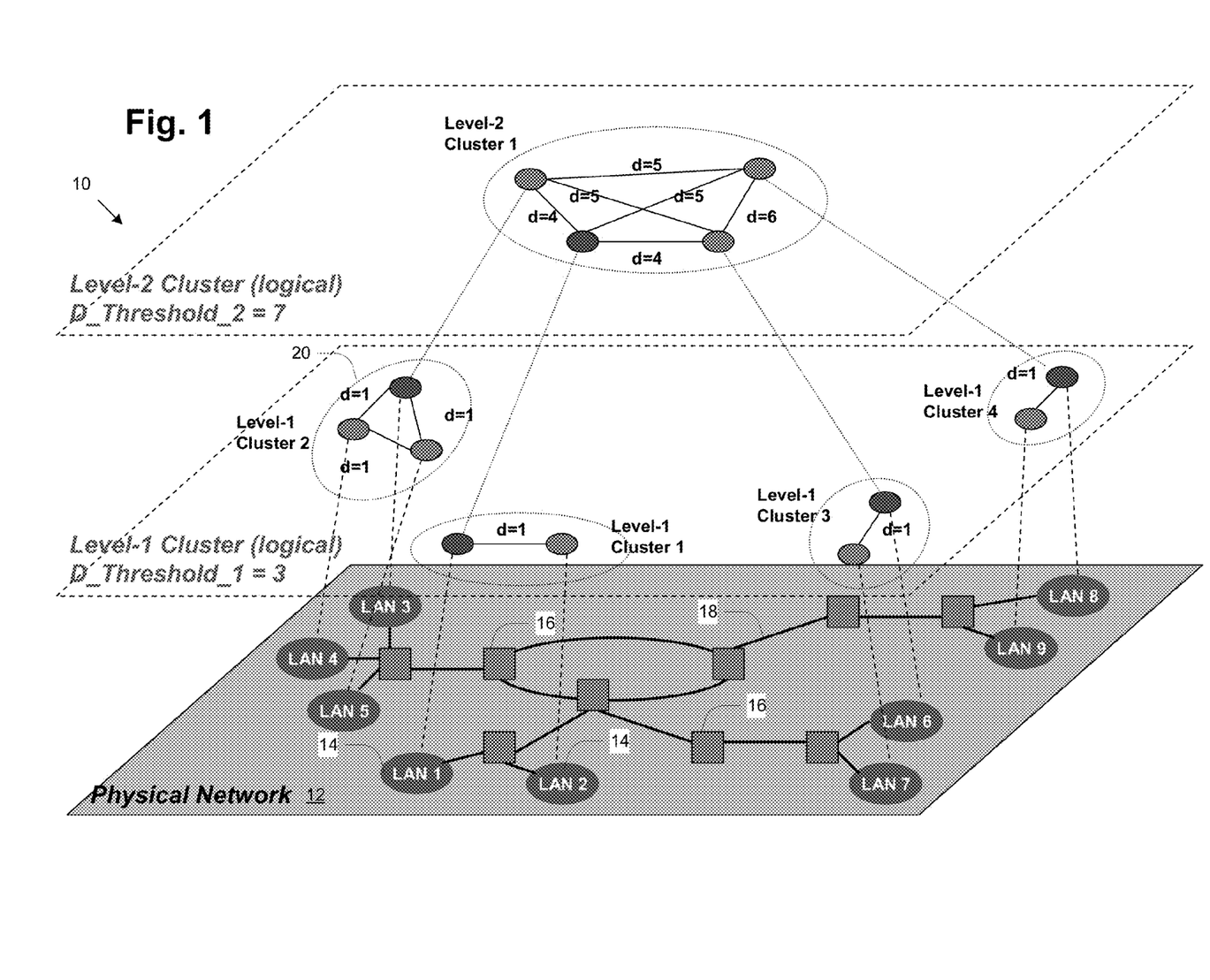
FIG. 1 is a block diagram of an overlay network.

FIG. 1 shows a simplified example overlay network 10 including components of a physical network 12 having a hierarchical cluster tree (HCT) configuration. In this example the HCT configuration establishes clusters at two logical levels shown as Level-1 and Level-2. The physical network is shown as including nine local-areas networks (LANs) 14 identified as LAN 1 through LAN 9, along with routers 16 and links 18 that connect each router 16 to either a LAN 14 or to another router 16. For sake of clarity, references numbers for some of these components are omitted, but it will be understood that LANs 14, routers 16 and links 18 are indicated by ovals, squares and thickened line segments respectively.

Although not shown in FIG. 1, each LAN 14 includes one or more physical computerized nodes each operative to perform data processing and storage operations. Additional details are provided below.

The clustering of LANs 14 is indicated for each of the two levels. Thus LAN 3, LAN 4 and LAN 5 form a Level-1 cluster 20 identified as Level-1 Cluster 2, for example. Within the depiction of each cluster are ovals representing corresponding LANs 14 as well as line segments used to indicate a "distance" d between each pairs of LANs 14. In the illustrated embodiment, distance is measured in units referred to as "hops", which in turn refers to the number of routers 14 along a shortest path between the pair of LANs 14. Again referring to the cluster 20 and its underlying physical-network components, the path between any LAN 14 and another LAN 14 in the cluster 20 is through one router 16, and thus the distance values are each shown as 1 (d=1). Additional details regarding the makeup of the clusters and how distance is measured are provided below.

Each level of the overlay network 10 is associated with a respective threshold D_Threshold that establishes the maximum "size" of the clusters at that level. At level 1, "size" refers to the largest inter-LAN distance in the cluster, whereas at higher levels size is the maximum distance between any two child clusters of the cluster (measured using "medoid nodes" described elsewhere herein). In the illustrated example, the threshold values for levels 1 and 2 are 3 and 7 respectively. Thus the inter-LAN distances in clusters at level 1 are constrained to be no more than three. FIG. 1 shows four clusters at level 1, each having a maximum inter-LAN distance of 1 which satisfies this criteria. Also, the distance between a LAN in any given cluster and a LAN in another cluster is more than three. For example, the distance between LAN 1 (in Level-1 Cluster 1) and LAN 5 (in Level-1 Cluster 2) is four, i.e., the shortest path between these two LANs traverses four routers 16.

The remaining description employs particular terminology for functional components, organization, data, etc. In the interest of clarity, the following presents a description of this terminology:

Network Distance: hop count between two LANs, i.e. number of layer-3 (network layer) routers/switches on the path between two LANs;

LAN Representative (LR) node: a node within a LAN that represents other nodes in the same LAN to communicate with nodes outside the LAN in clustering-related processes;

Level-1 Cluster: a collection of LANs that meet certain network metrics constraints (e.g., distance measured by hop count) among themselves at a lowest hierarchical level of the hierarchical cluster tree (HCT) overlay network;

Level-n Cluster: a collection of Level-(n−1) clusters that meet certain network metrics constraints amongst themselves, n>=2;

Cluster Proxy (CP) node: the LR node of a member LAN of a cluster that is the point of contact for communication with nodes in other clusters;

Cluster Medoid: Child cluster having the smallest network distance to all other child clusters;

Cluster Medoid (CM) node: LR node of the Cluster Medoid;

Cluster Radius: average network distance from the Cluster Medoid to all other child clusters;

Cluster Diameter: largest network distance between any two child clusters;

Registration Server (RS): a server with a public known name for purposes of registration, authentication, authorization, and accounting;

LAN ID: a sequence number assigned by the RS to a new LAN when the LAN first joins the overlay network;

Cluster ID: a hash value of LAN ID.

Figure 2:
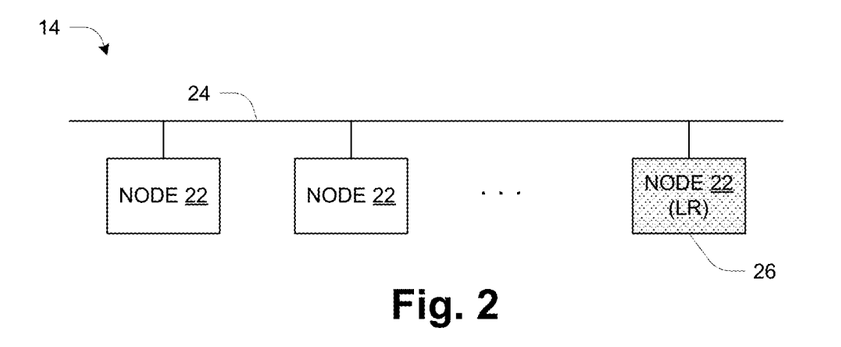
FIG. 2 is a block diagram of a LAN.

FIG. 2 illustrates the structure of a LAN 14. It is shown as a collection of one or more network nodes (nodes) 22 interconnected by a network segment 24. The structure of a node 22 is described below. The network segment 24 represents a layer-2 or data-link layer network, which may be physically realized in a variety of ways. For example, it may be realized using one or more layer-2 switches that interconnect the nodes 22. A LAN 14 is typically a "broadcast domain" for purposes of certain networking protocols, such as Address Resolution Protocol or ARP for example. A LAN 14 is a self-contained network whose structure and function may be largely hidden from the wider-area internetwork that couples multiple LANS 14 together. A central router 16 may know that a node 22 is reachable via a particular peripheral router 16 and can forward messages toward the peripheral router 16 at a network layer of operation, but the detailed operations by which a peripheral router 16 performs the local message forwarding to an endpoint node 22 of a LAN 14 are local operations distinct from the network layer of operation. In many cases a LAN 14 employs Ethernet technologies, for example, having distinct message formats ("frames") and specification of underlying physical link characteristics (data rates, signaling requirements, etc.).

As shown in FIG. 2, one node 22 serves a special role and is referred to as a LAN Representative or LR node 26. As defined above, an LR node 26 is the node within a LAN 14 that represents all the nodes 22 in that LAN 14 in communications pertaining to clustering within the overlay network 10. Specific examples are given below.

Referring back to FIG. 1, one LAN 14 in each cluster has a darker shading to indicate its status as containing the Cluster Medoid node, which as defined above is the LR node 26 of a member LAN 14 of the cluster that has the smallest average network distance to all other LR nodes 26 of same the cluster. Such a LAN 14 may be referred to as the CM LAN. This status is most apparent in Level-2 Cluster 1, which identifies LAN 1 as the CM LAN. LAN 1 has an average distance of 4.3 to the other LANs 14 of that cluster, while the other LANs all have higher average distances.

The purpose of clustering is to group nodes that are closer to each other in terms of network distance, which in turn is useful for a variety of purposes such as routing, data placement and other uses as described below. The basic clustering unit is a LAN 14, because the hop count (distance) to another LAN is the same for any two nodes in the LAN. To be able to represent a large scale network, a cluster level hierarchy is used, with levels extending from 1 to N where N is greater than or equal to 2.

A level-1 cluster consists of multiple LANs 14 such that network distance between any pair of LANs is less than or equal to a level-1 threshold parameter, d_threshold_1. The network distance is measured between the respective LR nodes 26 of the LANs 14. In one embodiment the distance is measured as "hop count", or the number of network-layer routers (e.g., IP routers) along a shortest path between the two LR nodes 26.

A level-n cluster (for all n greater than or equal to 2) consists of multiple level-(n−1) clusters such that network distance between any pair of level-(n−1) clusters is less than or equal to a threshold parameter d_threshold_n. The network distance is measured between the respective medoid nodes of each pair of clusters. Generally, d_threshold_n is greater than d_threshold_(n−1). For example, in some embodiments each d_threshold_n may be equal to 2*d_threshold_(n−1)+1.

With such a hierarchical cluster tree structure, a large scale network can be fairly accurately represented. Another advantage of such a hierarchical structure is that the cluster tree is flexible and can grow with the size of the system.

Figure 3:
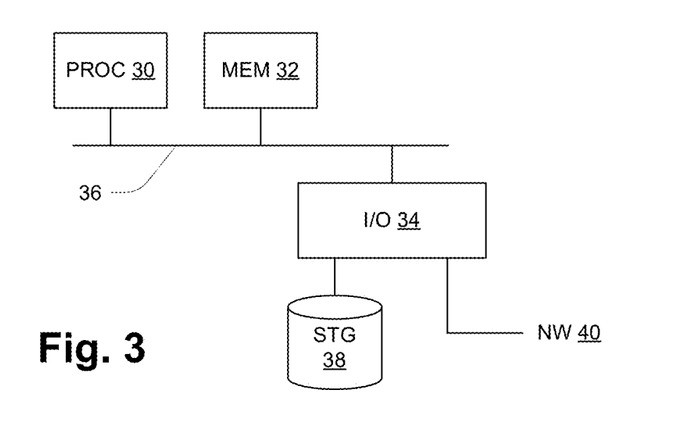
FIG. 3 is a schematic block diagram of a node.

FIG. 3 shows a hardware organization of a node 22, which is a computerized device generally including instruction processing circuitry (PROC) 30, memory 32, input/output circuitry (I/O) 34, and one or more data buses 36 providing high-speed data connections between these components. The I/O circuitry 34 typically has connections to at least a local storage device (STG) 38 as well as a network segment (NW) 40 of the LAN 14 in which the node 22 resides. In operation, the memory 32 includes sets of computer program instructions generally referred to as "programs" or "routines" as known in the art, and these sets of instructions are executed by the processing circuitry 30 to cause the node 22 to perform certain functions as described herein. It will be appreciated, for example, that in a typical case the functions described herein related to structure and functioning of the overlay network 10 are realized by corresponding programs executing at the nodes 22. Further, the programs may be included in a non-transitory computer readable medium storing a set of instructions which, when carried out by a set of nodes 22, cause the nodes 22 to perform the methods described herein. Non-limiting examples of such non-transitory computer readable media include magnetic disk or other magnetic data storage media, optical disk or other optical data storage media, non-volatile semiconductor memory such as flash-programmable read-only memory, etc.

Figure 4:
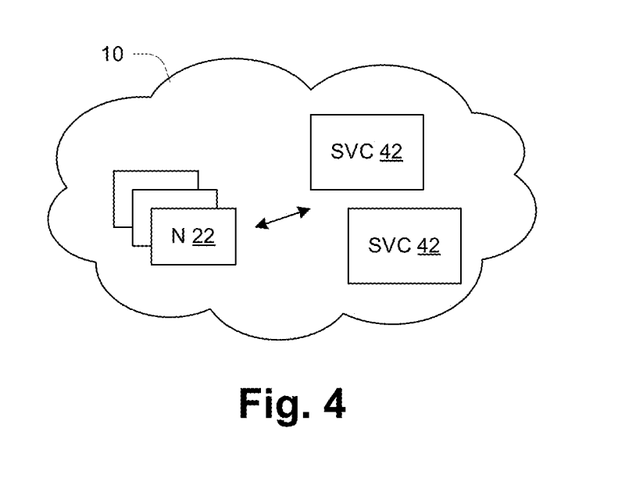
FIG. 4 is a schematic diagram of an overlay network at a service level.

FIG. 4 shows another aspect of the overlay network 10 which is the use of one or more service nodes (SVC) 42 apart from the nodes 22. A service node 42 may be realized as one or more server-type computers executing one or more service programs. A variety of different types of service nodes 42 may be employed. One example, described more fully below, is a registration server that assists the nodes 22 in the automatic self-forming of the overlay network 10.

Network Metrics Measurement

The nodes 22 measure at least distance, for establishing clusters as explained above, and may measure other useful parameters as well. One of these is bandwidth, which is a measure of the rate at which data can be sent from one LAN 14 to another LAN 14.

Network distance can be measured using the time-to-live (TTL) functionality in the Internet Protocol. A source node 22 sends probing packets with IP header time-to-live (TTL) field set to some relatively high value, such as 64 for example. Each router 16 along a path to a destination node is required to decrement the TTL value by at least 1. A destination node 22 detects network distance to the source node 22 by checking the value of the TTL field (more specifically, the difference between the received value and the known initial value) in received probing packets.

Network Bandwidth can be measured using packet pairs or packet trains. A source node sends sets of two or more packets having a known initial inter-packet time spacing, and the destination node measures inter-packet spacing dispersion to determine bandwidth.

Cluster Structure Information

Each cluster keeps track of lower level ("child") cluster member information as well as upper level ("parent") information in order to maintain the cluster hierarchical tree. A cluster has a Cluster Information Table that lists cluster parameters for itself, a Member Table that lists the lower level cluster information, and a Peer Table that lists network metrics between "peer" clusters (i.e., clusters at the same level as this cluster and also being under the same parent cluster). Tables 1-3 below show examples of how these tables may be organized. Referring to the Cluster Information Table (Table 1) for example, it may include a cluster identifier (ID), proxy node information, medoid node information, cluster radius, cluster diameter, parent cluster information including a parent cluster ID, parent proxy ID, distance and bandwidth (BW) to the parent, and the number of child clusters. The Cluster Member Table and Peer Table can include similar information for child clusters and peer clusters respectively.

TABLE 1

Cluster Information Table

| Cluster ID | Proxy Node Address | Medoid Node Address | Radius | Diameter | Cluster Level | Parent Cluster ID | Parent Proxy ID | Distance to Parent | BW to the Parent | Number of Child Clusters |
|---|---|---|---|---|---|---|---|---|---|---|

TABLE 2

Cluster Member Table

| Child Cluster ID | Proxy Node Address | Distance to the Child Cluster | BW to the Child Cluster | Status Flag (Active/Down) |
|---|---|---|---|---|

TABLE 1

Peer Table

| Peer Cluster ID | Proxy Node Address | Distance to the Cluster | BW to the Peer Cluster | Status Flag (Active/Down) |
|---|---|---|---|---|

Network Operation

Various aspects of operation of the network 10 are described below, including node initialization, registration, and several aspects of clustering.

Node Initialization

The following summarizes initialization operation of a node 22, performed for example at the time the node 22 powers up.

1. Power up, obtain node's own IP address and relevant local networking parameters;
2. Broadcast a Hello Message (see below) with a broadcast address over the LAN;
3. Start a Hello timer with a period of Hello_Interval seconds, where Hello_Interval is a configurable parameter, e.g. 5 seconds;
4. Listen for received Hello message while Hello timer runs
5. If Hello message received from other node(s) before Hello timer expires:
6. Identify LR node from received Hello messages;
7. Update LAN neighbor table;
8. Start node registration process as a "common" (non-LR) node;
9. else
10. Assume identity of LR node for the LAN;
11. Start node registration process as LR node;
12. end A Hello message contains information about the sending node, including node ID, LAN ID, number of nodes in the LAN, and an LR flag indicating whether the sending node is the LR node for the LAN. It may also include other information such as the Parent Cluster LR node address and one or more Peer LR node addresses.

Node Registration

At the end of initialization, a node 22 proceeds to a registration process. Node registration requires a Registration Server (RS), which as mentioned above is one type of service node 42 (FIG. 4). The RS preferably has a public name that can be looked up via DNS. For example, a RS may have a name such as register.contellation.net. A node 22 obtains the IP address of the RS by conducting a DNS lookup of the name.

Here are attributes and functions pertaining to a Registration Server:

1. Entry point for any new node joining the overlay network
2. Assigns a LAN ID to a new LAN
3. Provides traditional AAA functions as well
4. Has known domain name so as to be findable by the nodes The registration process can be a simple exchange of registration messages between a new node 22 and the Registration Server. A node 22 can register as a common (non-LR) node, or it can register as an LR node 26 if it is the first node to power up in a LAN 14.

If a node 22 registers as a common node, the node 22 may send only its node ID, relevant local networking parameters, and relevant credentials information (e.g. certificate) to the RS. The RS checks the node's credentials to authenticate the node. If the credentials check is successful, the RS adds the new node 22 to its registered node table, and sends a registration response message to the node 22 with a status code indicating success of the registration. If the credential check fails, the RS sends a registration response message to the node 22 with a status code indicating registration failure.

If a node 22 registers as an LR node, the registration message includes a flag indicating that the node 22 is an LR node. The RS checks credentials and responds as above. If the credentials check is successful, the registration response sent by the RS includes a LAN ID (to be used to identify the LAN in which the node 22 resides) and a list of one or more already registered nodes 22, any of which can be contacted by the new LR node 22 as part of a subsequent clustering process, described below. Each node identified in the list effectively serves as an entry point to the overlay network for the new LR node.

Clustering Process: New LAN Joins

The clustering process is an ongoing process after the first node is powered up in the network 10. As new LANs 14 power up and join the system, the cluster structure updates itself to reflect the evolving network topology. For a new LAN to join the cluster system, the following main procedure is followed.

Main Procedure:

1. Select a node from the list of registered node that is returned by the Registration Server, then query the selected node to find its parent cluster proxy (CP) node;
2. Continue querying successive parent proxy nodes until the current cluster hierarchical tree root node is located;
3. Measure distance from itself to the tree root node;
4. If distance to the tree root node is greater than the diameter threshold for the root cluster level, then 5. perform Tree Growth Procedure (below) (in this case the current cluster level is not sufficient)
6. else
7. perform Join Current Tree Procedure (below) (the current cluster level is sufficient)
8. end.

Tree Growth Procedure

This procedure is used to enlarge the current cluster tree in the case that the distance from the new LAN 14 to the current root level cluster is larger than the d_threshold_n value where n is the cluster level of the current root level cluster. A specific example of use of this procedure is described below.

1. Determine the level of increases for the current cluster tree in order to allow the new LAN to be part of the tree based on d_threshold_(n+k) values, where n is the current tree root level, and k is the level increase value, i.e. distance between the new LAN and the current root cluster medoid should be less than or equal to d_threshold_(n+k);
2. Create all (n+k−1) level clusters for the new LAN;
3. Create all k−1 higher level clusters for the current root cluster;
4. Create the (n+k) level cluster for the current root cluster, add the (n+k−1) level cluster of the new LAN as a member to the new root cluster;
5. Update new root level cluster medoid, radius, and diameter;
6. end.

Join Current Tree Procedure

This procedure is used when the new LAN can fit in an existing cluster structure.

1. From current tree root cluster, conduct breadth-first tree search to locate a cluster ID and level to join:
   a. cluster_id=current tree root cluster ID, cluster level m=n−1 where n=current root level;
   b. measure distance to all child clusters, and select the cluster x where distance between the new LAN and cluster x is the smallest;
   c. if distance to x is less than or equal to d_threshold_m
   d. cluster_id=x;
   e. m=m−1;
   f. go to step a and start to search again from the new cluster_id;
   g. else
   h. selected cluster=x;
   i. selected cluster level=m;
   j. search end;
2. Check cluster diameter constraint:
   a. For every lower level cluster within selected cluster, measure distance to new LAN
   b. If maximum distance to new LAN is less than or equal to d_threshold_m
   c. perform Join Selected Cluster Procedure (below) (new LAN can join the selected cluster);
   d. else
   e. perform Join As Peer Procedure (below) (new LAN cannot join the selected cluster)
   f. end
3. end.

Join Selected Cluster Procedure

When a new LAN meets diameter constraints of the selected cluster, the Join Selected Cluster Procedure is performed.

1. Create a level m−1 cluster for the new LAN, where m is the selected cluster level for join;
2. Create all levels between 1 and m−1 for the new LAN;
3. Add the level m−1 cluster for the new LAN to selected cluster;
4. Update medoid, radius, and diameter of the selected cluster;
5. If new medoid is different from the old medoid of the parent, continue to update parent's parent cluster until medoid does not change or the tree root is reached;
6. end.

Join as Peer Procedure

When a new LAN does not meet diameter constraints of the selected cluster, the Join As Peer Procedure is performed.

1. Create a new m level cluster for the new LAN, where m is the selected cluster level;
2. Create all levels from 1 to m−1 for the new LAN;
3. Add m level cluster for the new LAN to the parent cluster of the selected cluster;
4. Update medoid, radius, and diameter for the parent cluster;
5. If new medoid is different from the old medoid of the parent, continue to update parent's parent cluster until medoid does not change or the tree root is reached;
6. end.

Figure 5:
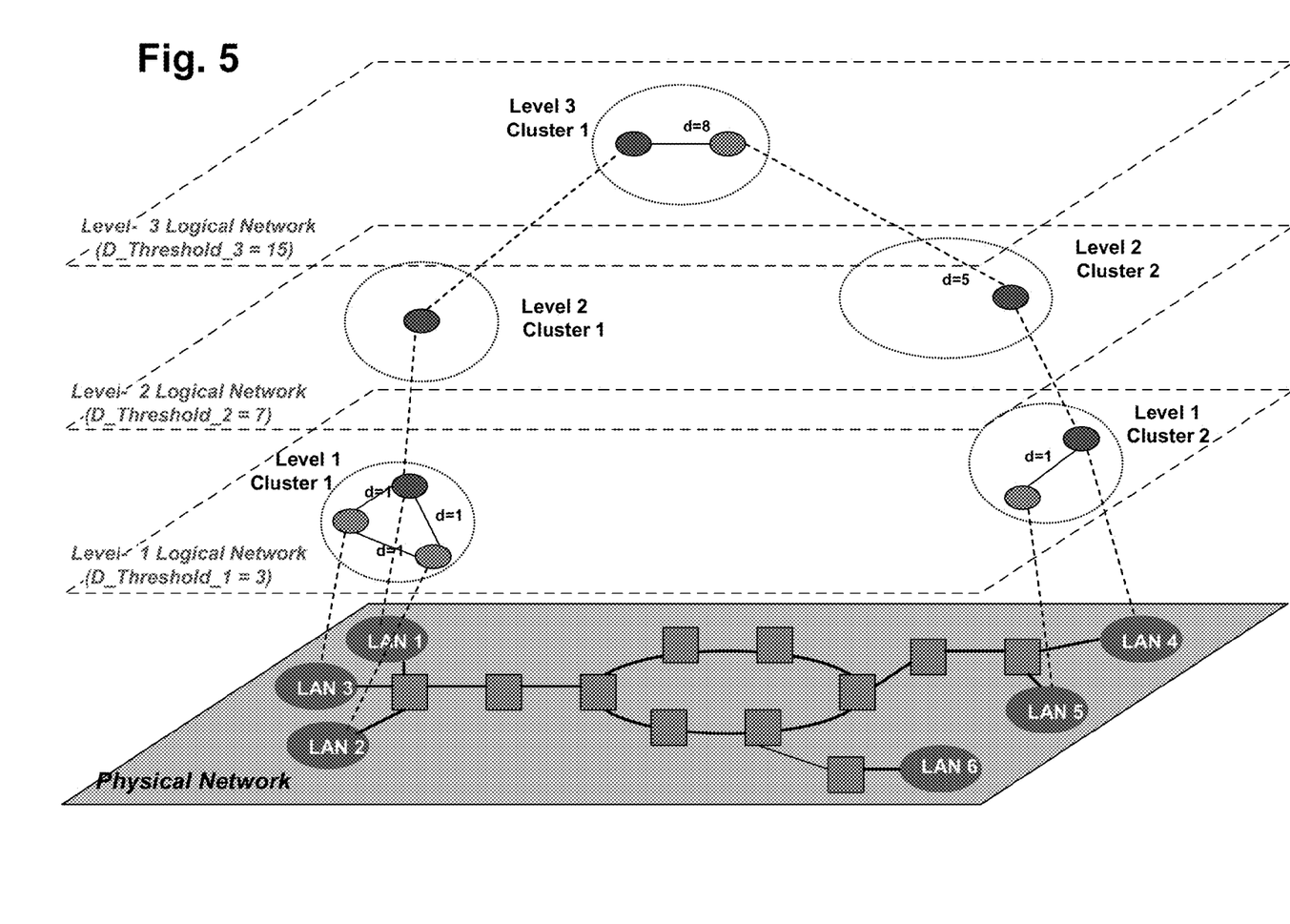
FIGS. 5-8 are block diagrams of an overlay network during different operations.
Figure 6:
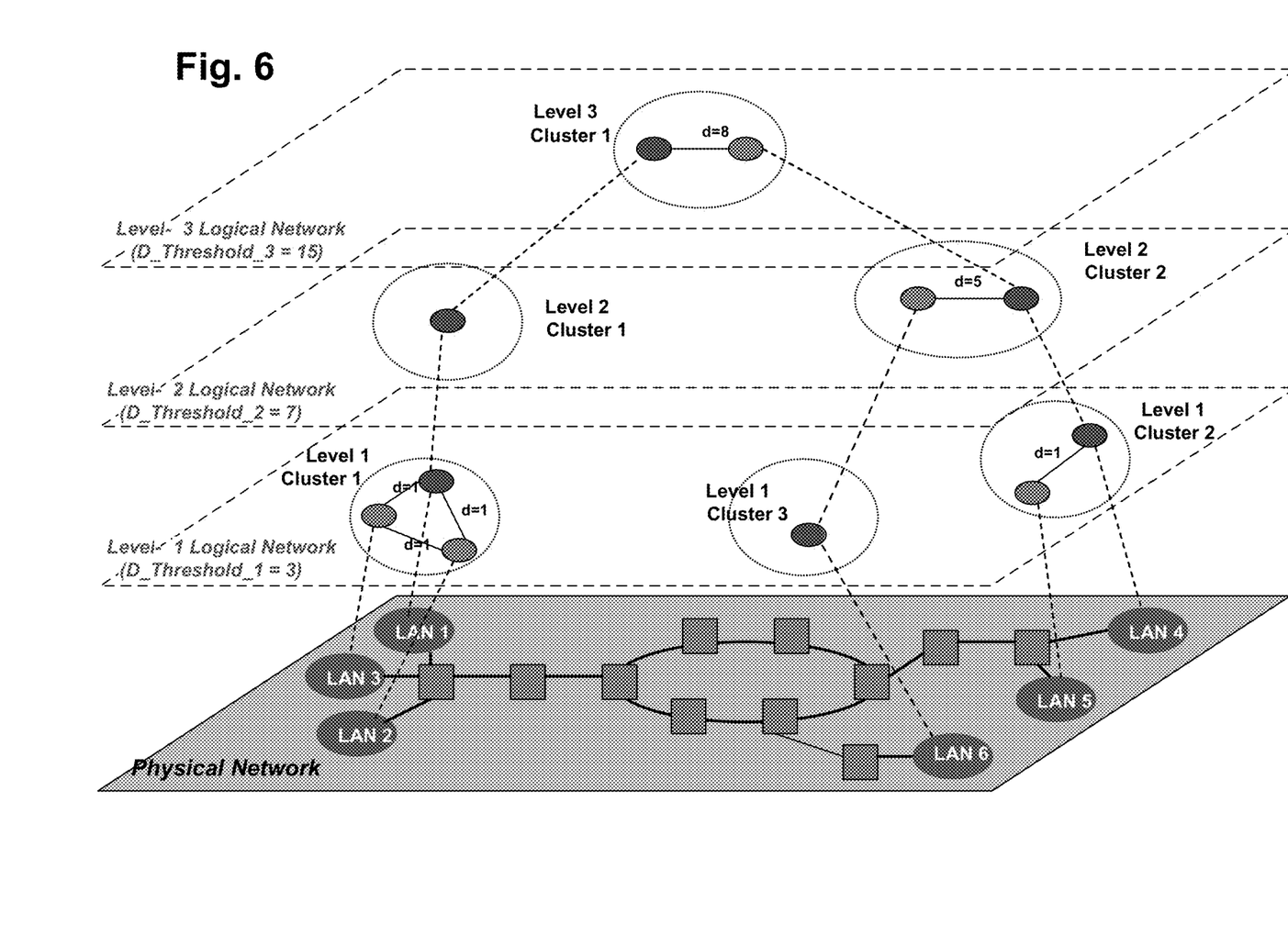

FIGS. 5 and 6 illustrate an example of the above procedures. An initial condition is as shown in FIG. 5, in which new LAN 6 is to join the overlay network. Using the above procedures, the following interactions occur:

1. As part of registration, the LR node of LAN 5 is identified as an existing LR node.
2. LAN 6 contacts LAN 5 and obtains identity of LR node of LAN 4 as CP node for Level-1 Cluster 2
3. LAN 6 makes successive inquiries of CP nodes at levels 2 and 3 until it identifies Level 3 Cluster 1 as the tree root.
4. LAN 6 measures the distance to LAN 1 (which contains tree root node), determines that the distance is less than the Level-3 threshold (6<15 in this example), concludes it can join current tree (rather than growing the tree)
5. LAN 6 requests child list from LAN 1 as CP for Level 3 Cluster 1
6. LAN 6 measures distances to LAN 1 (Level 2 Cluster 1) and LAN 4 (Level 2 Cluster 2) and concludes that it will join as part of Level 2 Cluster 2 as the closest cluster. It also concludes that it cannot join as part of Level 1 Cluster 2, because the distance exceeds the Level-1 threshold of 3.
7. LAN 6 creates a new level-1 cluster, Level 1 Cluster 3, and joins the level-2 cluster Level 2 Cluster 2.

FIG. 6 shows the modified HCT tree resulting from the above process.

Cluster Maintenance

When a node 22 or LAN 14 fails, the cluster tree needs to be updated. Maintenance procedures for these scenarios are described below.

Node Failure Maintenance

Since the basic clustering unit is a LAN, a single node failure in a LAN 14 does not affect the cluster hierarchy tree, although it may affect the LR node selection in the LAN 14.

Every node in a LAN periodically broadcast a Hello message, and every node keeps a neighbor table (as described above) that lists other neighboring nodes in the same LAN. The neighbor table is constructed and maintained by listening to periodic Hello messages from other nodes.

A node conducts the following node maintenance procedure to detect and react to node failure in the LA:

1. Listen to Hello messages;
2. If no Hello message from node x for three consecutive Hello intervals
3. {

4. If node x is the current LR node
5. {
6. check this node's own node ID;
7. If node's own ID is the smallest in the LAN;
8. {
9. Select itself as the new LR;
10. Broadcast an updated Hello message with LR flag on;
11. }
12. mark node x status as "down" in neighbor table;
13. } else (node x is a common node)
14. {
15. mark node x status as "down" in neighbor table;
16. }
17. }
18. go to step 1

LAN Failure Maintenance

When a LAN fails due to reasons such as failure of a switch or router, the cluster hierarchical tree may be affected. To be able to maintain cluster hierarchical structure, each cluster at each level will periodically exchange Status messages with its peer clusters. These Status messages can be used to detect LAN failures. Since LANs are members of level 1 cluster, it will be level 1 cluster that detects a LAN failure.

In a level 1 cluster, the LR node of each member LAN 14 periodically transmits a Status message to the Cluster Proxy (CP) node of the cluster. When the CP node receives a Status Message from an LR node, the CP node sends back a Status message to update the LR of other member LANs. This kind of handshake Status message can enable a CP node to detect failure of a LAN 14, as well as enable a LAN 14 to detect failure of a CP node.

Similar to level 1 clusters, at higher level clusters, Status messages are periodically exchanged between the CP node of the cluster and CP nodes of member clusters one level lower. These Status message can be used to update routing information in the cluster hierarchical tree, discussed in more detail below.

To avoid confusions between levels of clusters, the lower level clusters have a shorter Status message exchange interval than higher level clusters. Specifically, if the Status message exchange interval for level n is denoted Status_Interval_n, a relationship such as the following may be used: Hello_Interval<Status_Interval_1<Status_Interval 2<Status_Interval_3< . . . One way to set these intervals is the following:

Status_Interval_1=3*Hello_Interval;
Status_Interval_n=3*Status_Interval_(n−1), for n>=2.

The main reason to design Status message interval is to allow lower level clusters detect and adjust their clusters before higher level cluster adjustments.

CP LAN Failure Maintenance Procedure

If a LR node of a member LAN detects failure of the cluster's Cluster Proxy LAN (i.e., the member LAN 14 containing the CP node 22), the following procedure is performed:

1. Check the Cluster's Member table and compare member LAN's LAN ID;
2. If the node's own LAN ID is the lowest
3. {
4. Declare itself to be the new CP node of the cluster;
5. Send a Status message to all member LANs on the cluster's Member Table;
6. } else
7. {
8. Send a Status message to the lowest ID LAN's LR node;
9. Request the lowest LAN to be the new CP LAN;
10. }
11. Start Cluster Tree Update Procedure (below)

Non-CP LAN Failure Maintenance Procedure

If the CP node of a cluster detects failure of a non-CP member LAN, the following procedure is performed:

1. Update Cluster Member Table, mark the LAN status as "Down";
2. Send a Status Message to all remaining member LAN's LR nodes;
3. Start Cluster Tree Update Procedure.

Cluster Tree Update Procedure

When a LAN fails, the level 1 cluster that that LAN belongs to may now have a different medoid node, affecting distance to other clusters. To more accurately reflect the changed topology, the whole cluster tree needs to be updated. The following procedure is performed:

1. For the level 1 cluster y that detected LAN failure, update its new medoid;
2. If the new medoid is the same as the old medoid
3. {
4. end (no need for other action, medoid hasn't changed)
5. } else (there is a need to update the tree)
6. {
7. current_cluster=y;
8. current_cluster sends a Status message to its parent to request cluster update;
9. current_cluster's parent updates its radius and medoid;
10. if the new medoid is the same as old medoid;
11. {
12. update completes;
13. end;
14. } else need to go further up the tree
15. {
16. z=current_cluster parent;
17. current_cluster=z;
18. go to step 7
19. }
20. }

This tree update procedure strives to preserve existing level 1 cluster structure while updating the tree. The main reason for this update approach is to minimize migration of already stored data in the system when the tree structure evolves.

Figure 7:
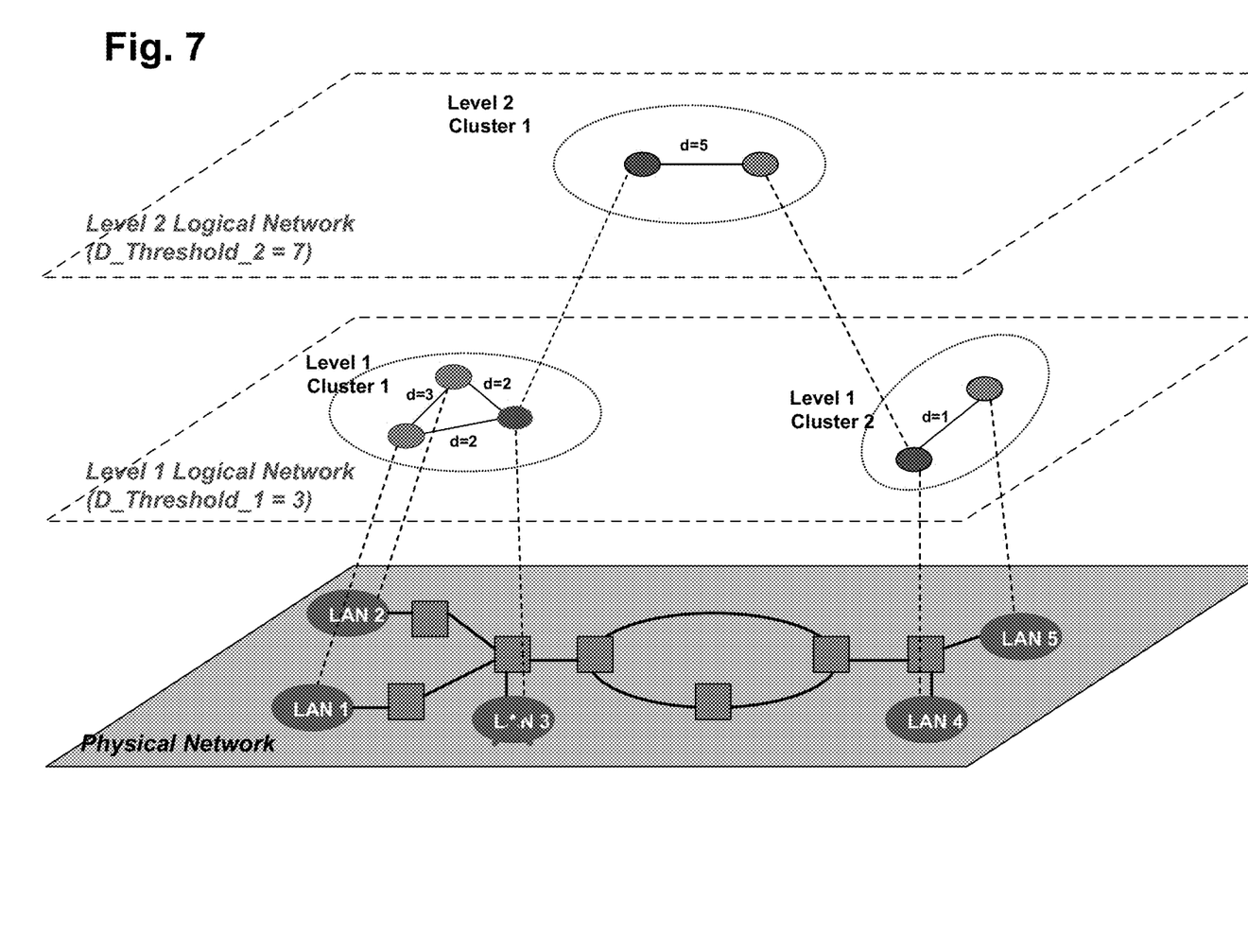
Figure 8:
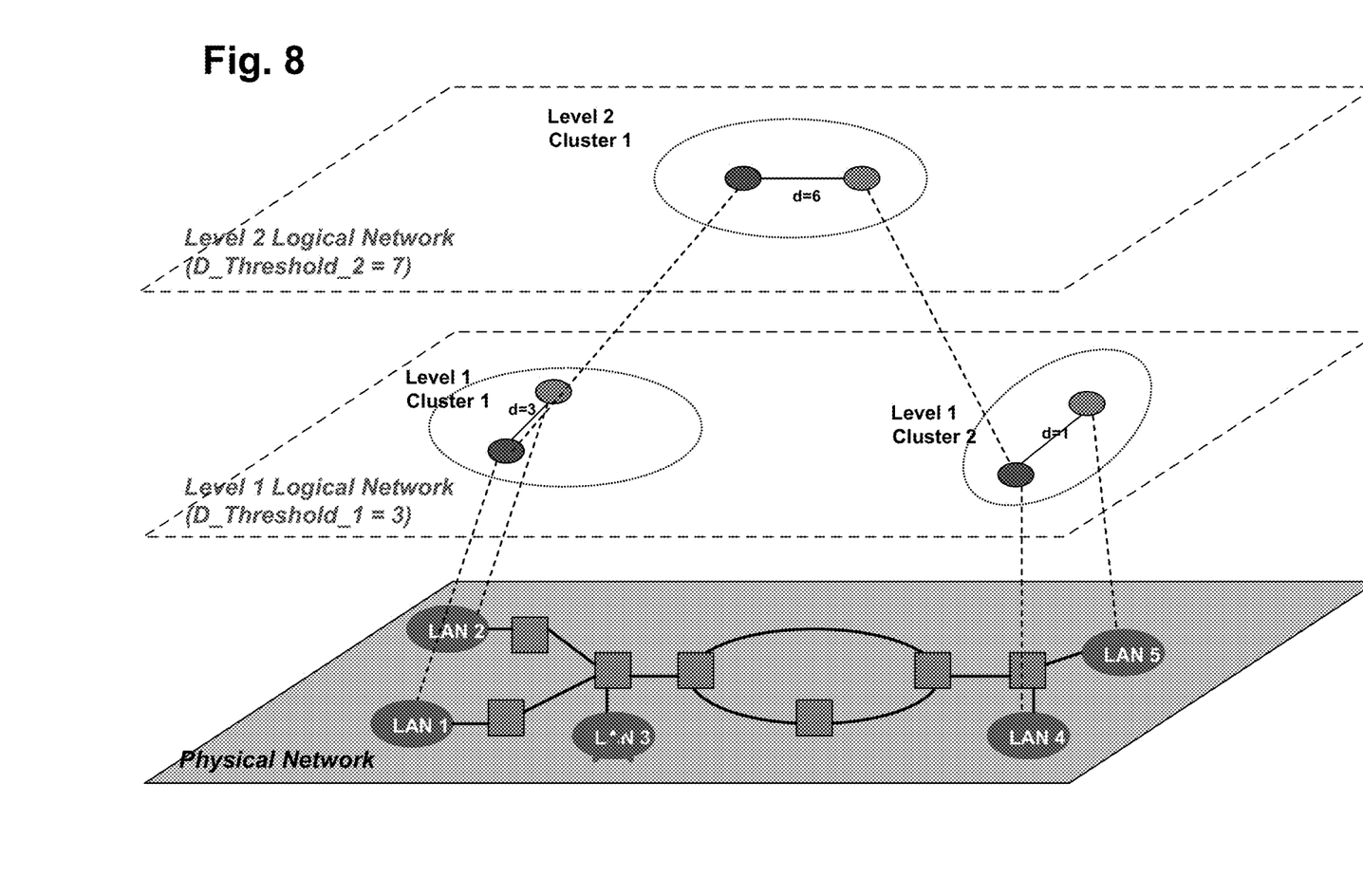

FIGS. 7 and 8 illustrate an example of the above cluster maintenance process when a LAN fails or otherwise leaves the network. The initial state is as shown in FIG. 7. As indicated by the red "X", LAN 3 is detected as not sending a Status message when expected. LAN 3 was the CP LAN for Level 1 Cluster 1 and Level 2 Cluster 1. The following occurs:

1. LAN 1 assumes CP role in Level 1 Cluster 1 and Level 2 Cluster 1.
2. LAN 1 calculates new medoid for Level 1 Cluster 1 and sees that it has changed (it is now LAN 1 instead of LAN 3)
3. LAN 1 updates the distance parameters in Level 2 Cluster 1.
4. LAN 1 calculates new medoid for Level 2 Cluster 1 and sees that it has changed (it is now LAN 1 instead of LAN 3).

Data Placement in Hierarchical Cluster Tree Overlay Network

One general use of overlay networks is as a large, distributed storage repository for data. Each node has local storage and is responsible for storage and retrieval of a particular segment of a data set. As an example, an overlay network may store a file system, in which case different files and directories are associated with different nodes of the network where they are stored and retrieved from. One very general example of an overlay network with distributed data is the World Wide Web, in which data objects (web pages, files, etc) are associated with different web sites via uniform resource locators (URLs), domain names and network addresses.

The overlay network 10 may support any of a variety of distributed data storage schemes. One general scheme that is contemplated is referred to as Distributed Hash Table or DHT. DHT schemes employ a predetermined data hashing calculation or algorithm that translates data objects into numbers or "keys" that are elements of a hash key space. These keys are then further mapped to corresponding network nodes, establishing the association between each data object and the node where it is located. A hash key space might be the set of 64-bit or 256-bit numbers, for example, as hash values of such size are generated by the hashing algorithm. The Secure Hashing Algorithm-256 (SHA-256) for example, generates 256-bit hash values, and thus the key space is the set of 256-bit numbers ("keys"). The additional mapping between key values and network nodes can be done in a variety of ways. For a given number of nodes, one approach is to simply divide the space equally among the nodes, associating each sub-space with a different node. As a simple example, if there are 64 ($2^6$) nodes, each node might be responsible for a corresponding different set of $2^{250}$ keys. Real systems are far more complex, and generally include mechanisms for re-mapping sub-spaces as nodes leave or join the network, among other important functions.

Figure 9:
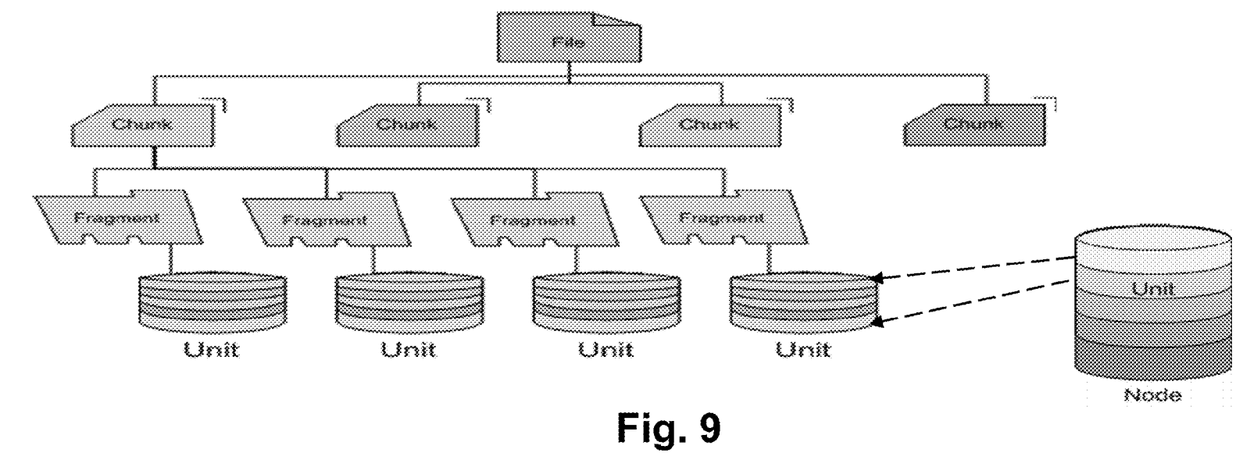
FIG. 9 is a schematic diagram depicting data placement in an overlay network.

FIG. 9 shows an example of data placement. A file is divided into a set of intermediate-size "chunks", and each chunk is further divided into "fragments". The fragments for a given chunk are distributed among different network nodes, shown as "units" in FIG. 9. The shading indicates fragments from different chunks or files that are stored at a given node. If a DHT scheme is used, one approach might be to hash each fragment and store it at the corresponding node based on the key value and key-to-node mapping. Another approach might take advantage of respective orderings of the fragments and nodes. Files may have an inherently linear organization so that fragments are inherently sequentially ordered. An ordering of the nodes may be established by some mechanism. In that case, a hash key for each chunk and the key-to-node mapping can be used to identify a first node on which a first fragment it stored, and the remaining sequence of fragments are implicitly understood to be stored on a corresponding following sequence of nodes.

With respect to the network 10 as disclosed herein, its use of LANs 14 as a basic organizational unit makes the network 10 particularly well suited for a two-level DHT data placement scheme. In such a scheme, one hash might be used to identify a starting LAN 14, while a separate hash is used to identify a starting node 22 within each LAN 14 in which a starting data fragment is to be placed. This has the potential benefit of simpler calculation for a given size key space, for example. Rather than calculating one 256-bit hash, for example, two smaller-size hashes can be calculated.

Another technique that may be used for data placement is to use hashes of file "metadata" to map the metadata to LANs 14 and nodes 22, and store information about the locations of fragments in the metadata. Metadata can include file identification information or other attributes, such as file name, directory or path name, owner, size, date, etc., along with the location information for the fragments of the file.

It will be appreciated that in any particular implementation, some or all nodes 22 will include the functionality of mapping data components to nodes 22 so that there is one globally shared understanding of how data is to be located in operation. The use of this functionality will be application specific. In some cases data to be stored may propagate through the network until it reaches the node responsible for storing it, as may be recognized at the destination node by comparing the hash key of the data to the hash key range for which the node is responsible. In other cases one node may specifically identify another node as the responsible node, and specifically send the data to that node along with a command to store it. Retrieval operations may likewise be done in different ways. Additionally, various other aspects of operation including the manner in which the mappings are established and managed, the use of replication or other data protection techniques, etc. can be tailored for specific applications.

Routing in Hierarchical Cluster Tree Overlay Network

Another fundamental aspect of network operation is the routing of messages among the nodes. In the network 10, some manner of message routing is required for any LAN to find and/or communicate with another LAN. The hierarchical cluster tree structure described above can be used to achieve efficient routing.

In one embodiment, each cluster maintains a routing table with information usable to reach other clusters in the neighborhood of the cluster, and the routing tables are propagated upwards to parent clusters so that a complete routing table can be constructed at the tree root. Specifically, a level 2 cluster may use periodic Status messages to report to its parent the routing tables of its level 1 child clusters. Similarly, a level 3 cluster combines its level 2 child cluster routing tables and reports to its parent, and so on until the tree top or "root".

Status messages sent from one cluster to its parent or children may include a cluster ID and level of the cluster that is sending the Status message; a Cluster Update Flag used to request a parent to update its cluster medoid and diameter; and a List of Reachable Clusters that lists all child and grandchild clusters.

Figure 10:
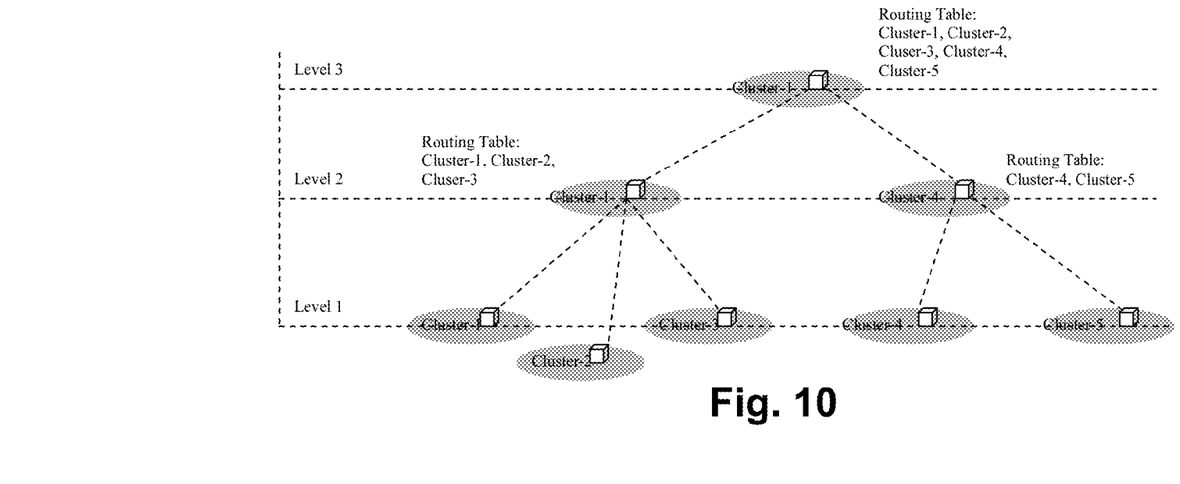
FIG. 10 is a schematic diagram depicting distribution of routing information in an overlay network.

FIG. 10 shows an example of the distribution of routing tables as described above. In this example a three-level cluster tree has five level-1 clusters, two level-2 clusters, and one level-3 cluster. At level 2, cluster-1's routing table has entries for the children level-1 clusters cluster-1, cluster-2, and cluster-3, and cluster-4's routing table has entries for the children level-1 clusters cluster-4 and cluster-5. At level 3, cluster-1's routing table has entries for all clusters. Routing with such tree structure can be completed with O(log N) steps lookup, where N is the total number of clusters.

It should be noted that FIG. 10 omits certain details for clarity. example, Level 1, cluster 1 has a routing table of LAN-1, LAN-2, LAN-3; cluster 2 has LAN-4, LAN-5, LAN-6, so on. At level 2, cluster 1 has a routing table of LAN-1, LAN-2, LAN-3, LAN-4, LAN-5, etc. The routing table always lists LAN as its routing entry.

Routing generally involves two steps. Step 1 is to locate a LAN, and step 2 is to locate a node within a LAN. The HCT routing table has no node IP addresses, only LAN information and its LR node address. In other words, HCT does not deal with individual nodes, but only LANs.

Routing can be done in one of two general ways, with the distinction being the manner in which messages are handled for which a node has no routing information. In one approach, the node may just forward such messages to its parent cluster, where the same process occurs (routing action is taken if information available, otherwise message forwarded further up the tree). In the other approach, the node sends a request up the tree to obtain routing information for the destination node, and upon receiving the information it takes local routing action. Each intermediate node either responds to the request if it has the information, or forwards the request up the tree. In either case, the "local routing action" generally entails creating a physical-network transport message for the received message and delivering the physical-network transport message to the physical network for routing toward the destination node. To do this, the information that is required is the network layer address (e.g., IP address) of the destination node. In effect, the overlay network functionality at a given node 22 is a user of the message transport service provided by the underlying physical network. This service includes encapsulating the message as a payload in a transport message, forwarding the transport message to a local router 16, hop-by-hop action of a succession of routers 16 to convey the transport message through the physical network to a physical-network interface of the destination node 22, and de-encapsulation and delivery of the payload message to the overlay network functionality in the destination node 22.

Administrative Policy Control in Clustering

There are scenarios where administrative policies may need to be enforced during the clustering process. For example, there may be rules that prohibit LANs from two different administrative domains to form a cluster even though these LANs are physically close to each other. The HCT protocol can allow such policies through the use of domain names, for example.

In order to support such an administrative policy, a predefined set of policy data may be stored in the network to specify which network domains are allowed to form clusters. The policy data may be stored in a policy file at the Registration Server (RS), for example. When a new LAN joins the network, the RS can include the policy file in its Registration Response message. Armed with the policy file, a new LAN can decide whether it is allowed to join an existing cluster, for example. If policy prohibits a cluster joining, a new cluster will be created.

The disclosed techniques may be embodied in a computer program product which includes a non-transitory computer readable medium storing a set of instructions which, when carried out by a set of computerized nodes, cause the set of computerized nodes to perform the methods described herein. Non-limiting examples of such non-transitory computer readable media include magnetic disk or other magnetic data storage media, optical disk or other optical data storage media, non-volatile semiconductor memory such as flash-programmable read-only memory, etc.

While various embodiments of the invention have been particularly shown and described, it will be understood by those skilled in the art that various changes in form and details may be made therein without departing from the spirit and scope of the invention as defined by the appended claims.

What is claimed is:

1. An overlay network, comprising:
a first level-1 cluster of local area networks (LANs);
a second level-1 cluster of LANs;
wherein:
each LAN includes one or more physical computerized nodes each operative to perform data processing and storage operations;
a distance between any pair of LANs of the first level-1 cluster of LANs is less than or equal to a predefined level-1 maximum distance value according to a distance metric, and a distance between any pair of LANs of the second level-1 cluster of LANs is less than or equal to the predefined level-1 maximum distance value;
one LAN of the first level-1 cluster of LANs has a first cluster medoid node used for measuring distance to other clusters, and one LAN of the second level-1 cluster of LANs has a second cluster medoid node using for measuring distance to other clusters; and
a level-2 cluster of LANs formed by the first and second level-1 clusters of LANs, a distance between the first cluster medoid node and the second cluster medoid node in the level-2 cluster of LANs being less than or equal to a predefined level-2 maximum distance value according to the distance metric, the predefined level-2 maximum distance value being greater than the predefined level-1 maximum distance value.

2. An overlay network according to claim 1, wherein one node of each LAN is a LAN representative, the LAN representative nodes of the LANs being operative to intercommunicate according to a hierarchical cluster tree protocol to establish, modify and maintain a hierarchical cluster tree structure of the overlay network.

3. An overlay network according to claim 2, wherein the hierarchical cluster tree protocol includes messages and procedures for respective operations including node initialization, node and LAN registration, cluster joining by a new LAN, and cluster maintenance responsive to node failure and LAN failure.

4. An overlay network according to claim 1, wherein each cluster of LANs is operative to maintain cluster tree structure information in a cluster information table, a cluster member table and a cluster peer table, wherein:
the cluster information table of a cluster storing an identifier of the cluster, an identification of a cluster proxy node and a medoid node, and parent cluster information including a parent identifier, a parent proxy identifier, and a distance to the parent;
the cluster member table of a cluster storing child cluster information pertaining to one or more child clusters, the child cluster information including identifiers of one or more child clusters, distances to the one or more child clusters, and operational status of the one or more child clusters; and
the cluster peer table of a cluster storing peer cluster information pertaining to one or more peer clusters sharing a common parent cluster with the cluster, the peer cluster information including identifiers of one or more peer clusters, distances to the one or more peer clusters, and operational status of the one or more peer clusters.

5. An overlay network according to claim 1, wherein the distance metric is hop count, hop count being a number of network routers along a shortest path between two nodes.

6. An overlay network according to claim 5, wherein the hop count is a weighted hop count, the weighted hop count being mathematical combination of the number of network routers along a shortest path between two nodes and a bandwidth of the shortest path between the two nodes.

7. An overlay network according to claim 1, wherein each node is operative to measure distance to other nodes using a probing message having a characteristic that is modified as the message travels between a pair of nodes.

8. An overlay network according to claim 7, wherein the characteristic is a time-to-live value that is decremented by successive routers of a physical network infrastructure interconnecting the LANs.

9. An overlay network according to claim 7, wherein the characteristic is a timing relationship between the probing message and other probing messages of a sequence of probing messages sent between a pair of nodes, the timing relationship changing based on bandwidth along a path of travel of the sequence of probing messages.

10. An overlay network according to claim 1 wherein the distance between the first medoid LAN and the second medoid LAN is greater than the predefined level-1 maximum distance metric.

11. An overlay network according to claim 1, further comprising:
    a third level-1 cluster of LANs;
    a second level-2 cluster of LANs formed by the third level-1 cluster of LANs;
    wherein:
        a distance between any pair of LANs of the third level-1 cluster of LANs being less than or equal to the predefined level-1 maximum distance value;
        one LAN of the third level-1 cluster of LANs having a third cluster medoid node used for measuring distance to other clusters; and
        a level-3 cluster of LANs formed by the first and second level-2 clusters of LANs, a distance between any pair of the first, second and third medoid nodes being less than or equal to a predefined level-3 maximum distance value according to the distance metric, the predefined level-3 maximum distance value being greater than the predefined level-2 maximum distance value.

12. An overlay network according to claim 1, wherein the medoid node of a cluster of LANs is a node having a smallest average distance to nodes of the other LANs of the cluster of LANs.

13. A method of operating a plurality of physical computerized nodes for constructing an overlay network, the physical computerized nodes being organized into local area networks (LANs) and each node being operative to perform data processing and storage operations, comprising:
    by the nodes, forming a first level-1 cluster of LANs;
    by the nodes, forming a second level-1 cluster of LANs; wherein: each LAN of the first and second level-1 clusters includes one or more of the physical computerized nodes,
    a distance between any pair of LANs of the first level-1 cluster of LANs is less than or equal to a predefined level-1 maximum distance metric, and a distance between any pair of LANs of the second level-1 cluster of LANs is less than or equal to the predefined level-1 maximum distance metric, one LAN of the first cluster of LANs has a first level-1 cluster medoid node used for measuring distance to other clusters, and one LAN of the second level-1 cluster of LANs has a second level-1 cluster medoid node used for measuring distance to other clusters, and
    joining the LANs of the first and second clusters of LANs to form a level-2 cluster of LANs in which a distance between the first cluster medoid node and the second cluster medoid node is less than or equal to a predefined level-2 maximum distance metric which is greater than the predefined level-1 maximum distance metric.

14. A non-transitory computer readable medium storing a set of instructions which, when carried out by a plurality of computerized nodes, cause the plurality of computerized nodes to perform a method of constructing an overlay network, the method comprising:
    forming a first level-1 cluster of local area networks (LANs);
    forming a second level-1 cluster of LANs;
    wherein:
        each LAN of the first and second level-1 clusters includes one or more physical computerized nodes each operative to perform data processing and storage operations,
        a distance between any pair of LANs of the first level-1 cluster of LANs is less than or equal to a predefined level-1 maximum distance metric, and a distance between any pair of LANs of the second level-1 cluster of LANs is less than or equal to the predefined level-1 maximum distance metric,
        one LAN of the first cluster of LANs has a first level-1 cluster medoid node used for measuring distance to other clusters, and one LAN of the second level-1 cluster of LANs has a second level-1 cluster medoid node used for measuring distance to other clusters, and
    joining the LANs of the first and second clusters of LANs to form a level-2 cluster of LANs in which a distance between the first cluster medoid node and the second cluster medoid node is less than or equal to a predefined level-2 maximum distance metric which is greater than the predefined level-1 maximum distance metric.

15. An overlay network, comprising:
    a plurality local area networks (LANs), each LAN including one or more physical computerized nodes each operative to perform data processing and storage operations; and
    a plurality of interconnected routers connected to the LANs, each connection between a router and either another router or a LAN being made by a respective network link,
    wherein each physical computerized node is configured and operated as a respective overlay network node of the overlay network, the overlay network being an organization of the overlay network nodes used for distributed storage and processing of application data, the overlay network being organized as an n-level hierarchical set of clusters for successive integers n, a level-1 cluster being a cluster of the LANs separated by no more than a level-1 distance limit expressed as units of a distance metric, a level-n cluster for n>1 being defined by a level-n distance limit also expressed as units of the distance metric, each level-n cluster being a cluster of level-(n−1) clusters having respective medoid nodes separated by no more than the level-n distance limit, the overlay network nodes employing the hierarchical set of clusters for routing messages and accessing application data distributed among the overlay network nodes in the overlay network.

16. An overlay network according to claim 1, wherein each cluster of LANs is operative to maintain cluster tree structure information including cluster information, cluster member information and cluster peer information, wherein:
    the cluster information for a cluster includes an identifier of the cluster, an identification a parent cluster of the cluster, and an indication of a hierarchical level of the cluster in the overlay network;
    the cluster member information for a cluster includes identifiers of one or more child clusters and respective distances to the child clusters; and
    the cluster peer information for a cluster relating to one or more peer clusters sharing a common parent cluster with the cluster, the peer cluster information including identifiers of the one or more peer clusters, and distances to the one or more peer clusters.

* * * * *